April 17, 1951 R. L. BROWN 2,548,942
AIR FILTER
Filed June 6, 1947
Fig. 1
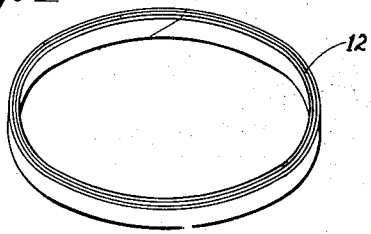
Fig. 2
Fig. 3
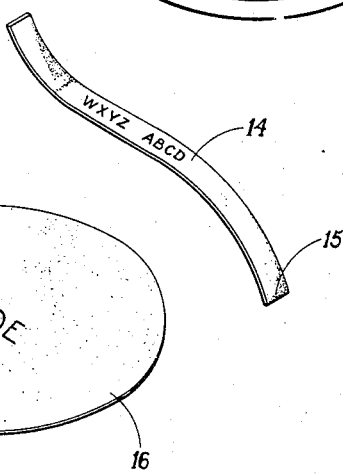
Fig. 4
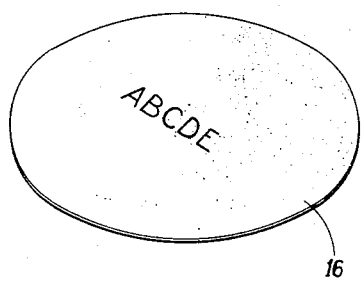
Fig. 5
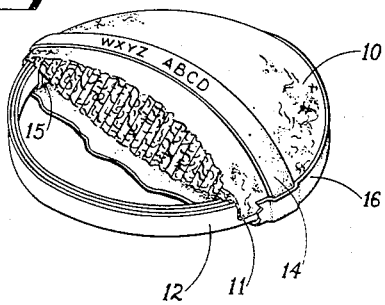
INVENTOR.
RAYMOND L. BROWN
BY
A. T. Sperry
ATTORNEY.

Patented Apr. 17, 1951

2,548,942

UNITED STATES PATENT OFFICE 2,548,942

AIR FILTER

Raymond L. Brown, Darien, Conn., assignor to Electrolux Corporation, Old Greenwich, Conn., a corporation of Delaware Application June 6, 1947, Serial No. 752,920

2 Claims. (Cl. 183—51)

This invention relates to air filters and is particularly concerned with air filters for use as secondary filtering means in domestic suction cleaners.

In suction cleaners for which the present invention is intended, a relatively stationary housing is provided. A motor-fan unit is mounted in the housing and a removable air filtering and dust collecting bag is also positioned in the housing ahead of the motor-fan unit-cleaning tools convey dust-laden air through a flexible hose and then to the bag. In such devices it is frequently found advantageous to provide a secondary filter which is designed to remove minute dirt and dust particles which may have passed through the primary dust separating and collecting bag. When placed between the motor and the outlet of the housing, such filters also function as a sound deadening means. These filters have also been used to disinfect or scent the air current by the evaporation of disinfecting or scenting fluid applied thereto.

The primary object of the present invention is to provide a novel, simple and inexpensive filter of the type described which is light in weight, strong, durable and highly effective in the removal of fine dust particles without unduly impairing the efficiency of the cleaner by the excessive increase of internal air resistance.

More specifically it is among the objects of this invention to provide an air filter incorporating a preformed filtering pad, thereby materially reducing the manufacturing cost and enhancing the efficiency and effectiveness of the composite filtering system.

Another specific object is to provide a filter utilizing a pad of felted combed cotton having heat and pressure moldable plastic impregnated areas wherein a sealed edge may be formed in situ.

A further important object of this invention is to provide a filter utilizing an inexpensive fiber base ring without any metal supporting parts or the consequent expense and weight thereof.

A further object of the invention is to provide a filter formed entirely of inexpensive materials and one which may be conveniently assembled by utilizing simple operations without the necessity of stitching, binding or other extraneous fastening means now used in such devices.

Numerous other objects and features of the present invention will become apparent upon consideration of the following specification taken in conjunction with the accompanying drawings in which:

Fig. 1 is a perspective view of the pad prior to its assembly;

Fig. 2 is a similar view of the base ring to which the pad is to be applied;

Fig. 3 is a view of the strap or handle for the filter;

Fig. 4 illustrates the flannel back cover; and

Fig. 5 is an assembled view partly in section showing the device ready for use in a suction cleaner.

As distinct from filters now commonly used in suction cleaners in which filtering material is placed within the confines of an encircling metallic ring and retained in position by front and back covers which are secured externally of the ring by tying with encircling string, the present device utilizes a felted pad of air pervious combed cotton having a heat and pressure moldable plastic content which permits the formation of a plastic rim with a filler of relatively impervious and closely bound fibers by the mere application of a heated die shaped in conformance with a particular bounding area thereof. In lieu of the metallic ring heretofore used which was convex in cross-section so as to accommodate strings for tying of the cover members, the present invention uses a simple non-metallic ring which may be conveniently formed of paper material spirally wound and cut from a continuously formed cylindrical tube. In assembling the present device, the edges of the pad are secured to the external surface of the ring preferably by gluing which may be accomplished by an automatic gluing fixture and a manipulating strap is applied over the outer face of the pad and also secured to the ring by gluing. The assembly is completed by the application of a rear air pervious flannel cloth which acts as a strengthening and backing member.

Referring now to the drawings, the pad is illustrated in Fig. 1 and comprises a felted material which may consist of 80% combed cotton fibers with which is mixed 20% of thermoplastic fibers, such as vinyl resin fibers, this material being formed into bats from which the circular disk is stamped. The edges of the disk are compacted by a heated die preferably during the stamping operation so that the circular body 10 is provided with a peripheral substantially impervious and relatively tough molded fabric-like rim 11 having a cotton filler, the rim being formed in situ thereon.

The ring 12 shown in Fig. 2 is preferably formed of spirally wound kraft paper, the layers of which are glued together so as to form a relatively stiff rigid ring of substantial strength. In practice such rings may be cut from continuously formed spiral tubing. The ring 12 is of a diameter substantially equal to the external diameter of the central pervious body of the pad 10 so that upon application of the pad to the ring the edges of the ring will contact the edges of the central portions of the pad. In assembly the external surface of the ring has glue applied thereto previous to the application of the pad. The pad is then applied to the ring and the edges 11 are turned down around the sides of the ring and are secured thereto by the glue.

After application and securement of the pad 10 to the ring 12, the strap 14 shown in Fig. 3 is laid across the outer face of the pad and the ends 15 are turned down around the sides formed by the edges 11 and are then turned inwardly to be secured by glue to the inner surface of the ring. The strap 14 may conveniently bear indicia either as advertising matter or as instructions in the method of utilizing the filter.

The filter is completed by the application of a flannel rear cover 16 which is of slightly larger diameter than the ring so that its outer edge can be turned down inwardly over the edges 11 of the pad 10. The application of glue to the external surfaces of the edges 11 provides convenient securement for the cover 16 which acts as a backing and reenforcing member of the assembly and which may also bear suitable indicia, such as the trade-mark of the manufacturer.

As shown in Fig. 5 the structure provides a simple, compact and rigid assembly, the combed cotton providing a minimum of air resistance with a maximum of air filtering, while the use of non-metallic elements throughout render the device comparatively inexpensive in manufacture and very light in weight without sacrificing any efficiency or effectiveness and without reducing the durability of the device.

It will be understood that the invention is not restricted to the specific materials here referred to, nor to the method steps herein suggested, therefore, numerous changes, modifications and the full use of equivalents may be resorted to without departure from the spirit or scope of the invention as outlined in the appended claims.

What I claim is:

1. In a secondary air filter for a tank type suction cleaner including a filter pad of fibers with the edges of the pad compacted and bonded to form a relatively tough fabric-like periphery, the combination with said filter pad of a spirally wound glue impregnated kraft paper ring glued to and supporting the peripheral edge of said pad, a manipulating flexible strap handle extending over said pad and secured to the inner face of said ring and a perforate cover over the face of said pad opposite the face over which the strap extends, the peripheral edges of said cover being glued to the periphery of said pad to secure said cover in place.

2. In a secondary air filter for a tank type suction cleaner including a filter pad of fibers having a relatively tough peripheral edge, the combination with said filter pad of a laminated paper cylindrical ring having two open ends and being adhesively secured to and supporting the peripheral edge of said pad over one open end of said cylindrical ring and along the outer cylindrical wall of said ring, a handle comprising a narrow fabric strip extending over said pad and secured around and under the inner cylindrical face of said ring and a cloth cover over the face of said pad opposite the face over which the strip extends and adhesively secured to the other open end of said cylindrical ring and around the outer cylindrical wall of said ring.

RAYMOND L. BROWN.

REFERENCES CITED

The following references are of record in the file of this patent:

UNITED STATES PATENTS

| Number | Name | Date |
|---|---|---|
| 1,581,450 | Kampf | Apr. 20, 1926 |
| 2,008,067 | Faber | July 16, 1935 |
| 2,035,097 | Schwartz | Mar. 24, 1936 |
| 2,156,857 | Kroenlein | May 2, 1939 |
| 2,324,838 | Harz et al. | July 20, 1943 |
| 2,353,717 | Francis, Jr., et al. | July 18, 1944 |
| 2,433,727 | Arnold | Dec. 30, 1947 |

FOREIGN PATENTS

| Number | Country | Date |
|---|---|---|
| 394,796 | Great Britain | July 6, 1933 |
| 638,692 | France | Feb. 27, 1928 |